United States Patent
Babu et al.

(10) Patent No.: US 11,500,470 B2
(45) Date of Patent: Nov. 15, 2022

(54) SYSTEM AND METHOD OF VEHICLE AWARE GESTURE RECOGNITION IN VEHICLES WITH SMART HELMETS

(71) Applicant: Robert Bosch GmbH, Stuttgart (DE)

(72) Inventors: Benzun Pious Wisely Babu, San Jose, CA (US); Zeng Dai, Santa Clara, CA (US); Shabnam Ghaffarzadegan, San Mateo, CA (US); Liu Ren, Cupertino, CA (US)

(73) Assignee: ROBERT BOSCH GMBH

( * ) Notice: Subject to any disclaimer, the term of this patent is extended or adjusted under 35 U.S.C. 154(b) by 0 days.

(21) Appl. No.: 16/725,170

(22) Filed: Dec. 23, 2019

(65) Prior Publication Data

US 2021/0191518 A1    Jun. 24, 2021

(51) Int. Cl.
| | |
|---|---|
| *A42B 3/04* | (2006.01) |
| *H04W 12/082* | (2021.01) |
| *G06T 11/60* | (2006.01) |
| *G05D 1/02* | (2020.01) |
| *G06T 13/40* | (2011.01) |
| *G06F 3/01* | (2006.01) |
| *G07C 5/08* | (2006.01) |
| *H04B 1/38* | (2015.01) |
| *H04L 67/12* | (2022.01) |
| *H04B 1/3827* | (2015.01) |
| *G07C 5/00* | (2006.01) |

(52) U.S. Cl.
CPC .............. *G06F 3/017* (2013.01); *G06F 3/012* (2013.01); *G06F 3/013* (2013.01); *G07C 5/008* (2013.01); *G07C 5/085* (2013.01); *G07C 5/0825* (2013.01); *H04B 1/385* (2013.01); *H04L 67/12* (2013.01); *H04B 2001/3866* (2013.01)

(58) Field of Classification Search
CPC ............ G06F 3/012–017; G07C 5/008; G07C 5/0825–085; H04B 1/385; H04L 67/12
See application file for complete search history.

(56) References Cited

U.S. PATENT DOCUMENTS

| | | | |
|---|---|---|---|
| 2015/0084849 A1 | 3/2015 | Shin | |
| 2016/0007849 A1 | 1/2016 | Krueger | |
| 2018/0089901 A1* | 3/2018 | Rober | G06T 13/40 |
| 2018/0096501 A1* | 4/2018 | Anderson | G06V 20/56 |
| 2019/0302761 A1* | 10/2019 | Huang | G05D 1/0221 |
| 2019/0332902 A1* | 10/2019 | Gallagher | G06K 9/6293 |
| 2019/0385419 A1* | 12/2019 | Araki | G06T 11/60 |

(Continued)

FOREIGN PATENT DOCUMENTS

| | | | |
|---|---|---|---|
| CN | 108572719 A | 9/2018 | |
| DE | WO 2018/06332 A1 * | 11/2018 | G05D 25/02 |

*Primary Examiner* — Lin Li
(74) *Attorney, Agent, or Firm* — Dickinson Wright PLLC (57) ABSTRACT

A helmet includes a transceiver configured to receive vehicle data from one or more sensors located on a vehicle, an inertial measurement unit (IMU) configured to collect helmet motion data of the helmet associated with a rider of the vehicle, and a processor in communication with the transceiver and IMU, and programmed to receive, via the transceiver, vehicle data from the one or more sensors located on the vehicle, determine a gesture in response to the vehicle data from the one or more sensors located on the vehicle and the helmet motion data from the IMU, and output on a display of the helmet a status interface related to the vehicle, in response to the gesture.

18 Claims, 3 Drawing Sheets

(56) References Cited

U.S. PATENT DOCUMENTS

| | | | |
|---|---|---|---|
| 2020/0106960 A1* | 4/2020 | Aguilar | H04N 17/002 |
| 2020/0137665 A1* | 4/2020 | Judi | H04W 12/082 |
| 2020/0145815 A1* | 5/2020 | Taylor | A42B 3/0433 |
| 2020/0204966 A1* | 6/2020 | Thagadur Shivappa | H04R 5/02 |

* cited by examiner

SYSTEM AND METHOD OF VEHICLE AWARE GESTURE RECOGNITION IN VEHICLES WITH SMART HELMETS

TECHNICAL FIELD

The present disclosure relates to intelligent helmets, such as those utilized on motorcycles or other vehicles including dirt bikes, three-wheeler vehicles, or four-wheeler vehicles such as an all-terrain vehicle or the like.

BACKGROUND

Smart helmets may be utilized by two-wheeler riders to provide information regarding head mounted see-through displays. The helmets may provide an unobstructed view of the world while overlaying alerts, notifications, and status information for the user or rider. Interaction with such information may be essential for immersive user experience. Current helmets allow for speech interaction to be used to navigate and select the display elements. However, while the rider is traveling at high speed, speech interaction can be comparatively slow and limited. In most cases, the speech interaction may be multiplexed with rider intercom that impose limitations on the functionality. Additionally, speech interaction may impose a higher cognitive load on the rider in comparison to other interaction modalities. There may be benefits to complementing speech interaction with additional interaction modalities.

SUMMARY

According to one embodiment, a helmet includes a transceiver configured to receive vehicle data from one or more sensors located on a vehicle, an inertial measurement unit (IMU) configured to collect motion data of the helmet worn by the rider of the vehicle, and a processor in communication with the transceiver and IMU, and programmed to receive, via the transceiver, vehicle data from the one or more sensors located on the vehicle, determine a gesture in response to the vehicle data from the one or more sensors located on the vehicle and the helmet motion data from the IMU, and output on a display of the helmet a status interface related to the vehicle, in response to the gesture.

According to a second embodiment, A system that includes a helmet and a vehicle with at least two wheels includes a helmet transceiver configured to receive vehicle data from one or more sensors located on the vehicle, a helmet inertial measurement unit (IMU) configured to collect helmet motion data associated with the helmet, a rider-facing camera located on the vehicle and configured to monitor a rider of the vehicle and collect rider image data, and a processor in the helmet in communication with the helmet transceiver and helmet IMU. The processor is further programmed to receive, via the transceiver, gesture data from the helmet transceiver and vehicle motion data from a vehicle IMU, determine a gesture in response to the gesture data and compensate it with the vehicle motion data, and output on display of a helmet an action in response to the gesture.

According to a third embodiment, a helmet includes a transceiver configured to receive vehicle data from one or more sensors located on a vehicle, an inertial measurement unit (IMU) configured to collect helmet motion data of the helmet associated with a rider of the vehicle, and a processor in communication with the transceiver and IMU, and programmed to receive, via the transceiver, vehicle data from the one or more sensors located on the vehicle determine a gesture in response to the vehicle data from the one or more sensors located on the vehicle and the helmet motion data from the IMU, and execute a command in response to the gesture.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure makes references to helmets and saddle-ride vehicles. It should be understood that a "saddle-ride vehicle" typically refers to a motorcycle, but can include any type of automotive vehicle in which the driver typically sits on a saddle, and in which helmets are typically worn due to absence of cabin to protect the rider. Other than a motorcycle, this can also include powered two-wheeler (PTW) vehicles such as dirt bikes, scooters, and the like. This can also include a powered three-wheeler, or a powered four-wheeler such as an all-terrain vehicle (ATV) and the like. Any references specifically to a motorcycle or bike can also apply to any other saddle-ride vehicle, unless noted otherwise.

A system may be utilized for recognizing head gestures on a moving two wheeler (or more vehicle) for interacting with a smart helmet display. The detected gestures may be used to control the display layout on the smart helmet. Common head gestures such as nodding, pitching, lookup, yaw, and head tilt, etc., may be utilized to interact with the smart helmet. Thus, the rider may not need to utilize their hands, which may be holding onto handle bars, to operate the system. The motion measurements from the motorcycle may be used to compensate for the motion measurements from the riders' head, thus allowing us to use existing gesture recognition modules.

The disclosure below describes a system that enables a rider to interact with a smart helmet based on head gestures. The system uses sensors on the smart helmet in conjunction with the sensors on the motorcycle to robustly detect gestures. The detected gestures are used to control the display layout on the smart helmet. Common head gestures such as nodding, pitching, lookup, yaw, head tilt is used to interact with the smart helmet. These gestures can be performed while the rider maintains attention on the road. Since these interactions are natural, they can be performed while using the intercom.

Gesture recognition may be performed using measurements either from a visual cameras or an inertial measurement units (IMU) attached to the helmet. An IMU produces a time series measurement of the linear acceleration and rotational rate. An end-to end method can learn to recognize gestures based on raw measurements from the IMU. However, in order to robustly recognize gestures in dynamic conditions caused by the vehicle motion, the system may need to sample gestures while the rider is experiencing vehicle motions. In order to perform robust head gestures recognition, the system may need to collect gestures while the vehicle experiences motion, such as wheel jerks, vehicle tilt, etc.

As disclosed below, the system may utilize an IMU on the motorcycle in addition to the IMU measurements from the helmet to perform robust gesture recognition. The system may be supported with visual camera measurements. The motorcycle motion estimated based on the IMU observations is used to stabilize the IMU motion from the helmet. This may enable gesture recognition trained on riders while stationary to be used in moving conditions. Though one embodiment may not utilize visual measurements from a camera, the same approach can be extended to use additional sensors, such as cameras.

Figure 1:
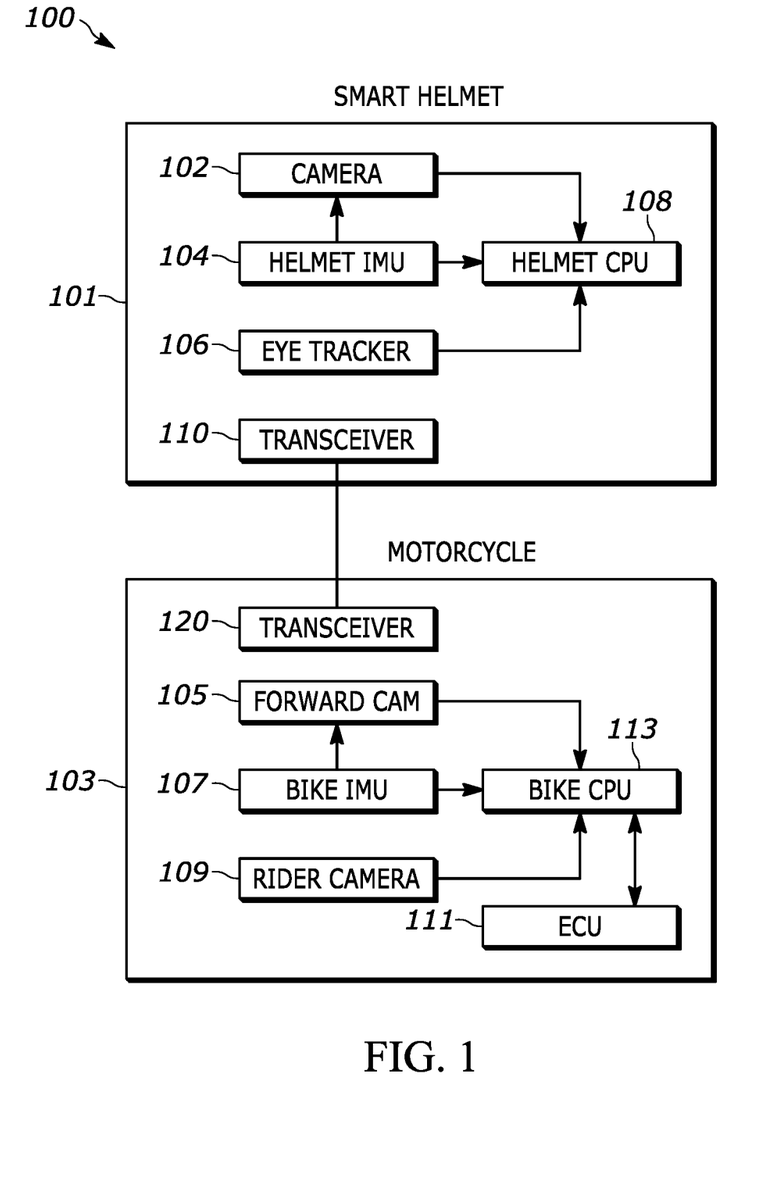
FIG. 1 is an example of a system design 100 that includes a smart helmet 101 and a motorcycle 103.

FIG. 1 is an example of a system design 100 that includes a smart helmet 101 and a motorcycle 103. The smart helmet 101 and motorcycle 103 may include various components and sensors that interact with each other. The smart helmet 101 may focus on collecting data related to body and head movement of a driver. In one example, the smart helmet 101 may include a camera 102. The camera 102 of the helmet 101 may include a primary sensor that is utilizing for position and orientation recognition in moving vehicles. Thus, the camera 102 may face outside of the helmet 101 to track other vehicles and objects surrounding a rider. The camera 102 may have difficulty capturing dynamics of such objects and vehicles. In another example, the helmet 101 may be included with radar or LIDAR sensors, in addition to or instead of the camera 102.

The helmet 101 may also include a helmet inertial measurement unit (IMU) 104. The helmet IMU 104 may be utilized to track high dynamic motion of a rider's head. Thus, the helmet IMU 104 may be utilized to track the direction a rider is facing or the rider viewing direction. Additionally, the helmet IMU 104 may be utilized for tracking sudden movements and other movements that may arise. An IMU may include one or more motion sensors.

An Inertial Measurement Unit (IMU) may measure and report a body's specific force, angular rate, and sometimes the earth's magnetic field, using a combination of accelerometers and gyroscopes, sometimes also magnetometers. IMUs are typically used to maneuver aircraft, including unmanned aerial vehicles (UAVs), among many others, and spacecraft, including satellites and landers. The IMU may be utilized as a component of inertial navigation systems used in various vehicle systems. The data collected from the IMU's sensors may allow a computer to track a motor position.

An IMU may work by detecting the current rate of acceleration using one or more axes, and detect changes in rotational attributes like pitch, roll and yaw using one or more axes. Typical IMU also includes a magnetometer, which may be used to assist calibration against orientation drift by using earth's magnetic field measurements. Inertial navigation systems contain IMUs that have angular and linear accelerometers (for changes in position); some IMUs include a gyroscopic element (for maintaining an absolute angular reference). Angular rate meters measure how a vehicle may be rotating in space. There may be at least one sensor for each of the three axes: pitch (nose up and down), yaw (nose left and right) and roll (clockwise or counter-clockwise from the cockpit). Linear accelerometers may measure non-gravitational accelerations of the vehicle. Since it may move in three axes (up & down, left & right, forward & back), there may be a linear accelerometer for each axis. The three gyroscopes are commonly placed in a similar orthogonal pattern, measuring rotational position in reference to an arbitrarily chosen coordinate system. A computer may continually calculate the vehicle's current position. For each of the six degrees of freedom (x,y,z and Ox, Oy, and Oz), it may integrate over time the sensed acceleration, together with an estimate of gravity, to calculate the current velocity. It may also integrate the velocity to calculate the current position. Some of the measurements provided by an IMU are below:

$$\hat{a}_B = R_{BW}(a_w - g_w) + b_a + \eta_a$$

$$\hat{\omega}_B = \omega_B + b_g + \eta_g$$

$(\hat{a}_B, \hat{\omega}_B)$ are the raw measurements from the IMU in the body frame of the IMU. $a_w$, $\omega_B$ are the expected correct acceleration and the gyroscope rate measurements. $b_a$, $b_g$ are the bias offsets in accelerometer and the gyroscope. $\eta_a$, $\eta_g$ are the noises in accelerometer and the gyroscope.

The helmet 101 may also include an eye tracker 106. The eye tracker 106 may be utilized to determine a direction of where a rider of the motorcycle 103 is looking. The eye tracker 106 can also be utilized to identify drowsiness and tiredness or a rider of the PTW. The eye tracker 106 may identify various parts of the eye (e.g. retina, cornea, etc.) to determine where a user is glancing. The eye tracker 106 may include a camera or other sensor to aid in tracking eye movement of a rider.

The helmet 101 may also include a helmet processor 108. The helmet processor 107 may be utilized for sensor fusion of data collected by the various camera and sensors of both the motorcycle 103 and helmet 101. In other embodiment, the helmet may include one or more transceivers that are utilized for short-range communication and long-range communication. Short-range communication of the helmet may include communication with the motorcycle 103, or other vehicles and objects nearby. In another embodiment, long-range communication may include communicating to an off-board server, the Internet, "cloud," cellular communication, etc. The helmet 101 and motorcycle 103 may communicate with each other utilizing wireless protocols implemented by a transceiver located on both the helmet 101 and motorcycle 103. Such protocols may include Bluetooth, Wi-Fi, etc. The helmet 101 may also include a heads-up display (HUD) that is utilized to output graphical images on a visor of the helmet 101.

The motorcycle 103 may include a forward-facing camera 105. The forward-facing camera 105 may be located on a headlamp or other similar area of the motorcycle 103. The forward-facing camera 105 may be utilized to help identify where the PTW is heading. Furthermore, the forward-facing camera 105 may identify various objects or vehicles ahead of the motorcycle 103. The forward-facing camera 105 may thus aid in various safety systems, such as an intelligent cruise control or collision-detection systems.

The motorcycle 103 may include a bike IMU 107. The bike IMU 107 may be attached to a headlight or other similar area of the PTW. The bike IMU 107 may collect inertial data that may be utilized to understand movement of the bike. The bike IMU 107 have multiple axis accelerometer, typically in three orthogonal axes. Similarly, the bike IMU 107 may also include multiple gyroscopes.

The motorcycle 103 may include a rider camera 109. The rider camera 109 may be utilized to keep track of a rider of the motorcycle 103. The rider camera 109 may be mounted in various locations along a handlebar of the motorcycle, or other locations to face the rider. The rider camera 109 may be utilized to capture images or video of the rider that are in turn utilized for various calculations, such as identifying various body parts or movement of the rider. The rider camera 109 may also be utilized to focus on the eye's of the rider. As such, eye gaze movement may be determined to figure out where the rider is looking.

The motorcycle 103 may include an electronic control unit 111. The ECU 111 may be utilized to process data collected by sensors on the motorcycle, as well as data collected by sensors on the helmet. The ECU 111 may utilize the data received from the various IMUs and cameras to process and calculate various positions or to conduct object recognition. The ECU 111 may be in communication with the rider camera 109, as well as the forward-facing camera 105. For example, the data from the IMUs may be fed to the ECU 111 to identify position relative to a reference point, as well as orientation. When image data is combined with such calculations, the bike's movement can be utilized to identify the direction a rider is facing or focusing on. The image data from both the forward facing camera on the bike and the camera on the helmet are compared to determine the relative orientation between the bike and the riders head. The image comparison can be performed based on sparse features extracted from both the cameras (e.g., rider camera 109 and forward-facing camera 105). The motorcycle 103 may include a bike central processing unit 113 to support the ECU. The system may thus continuously monitor the rider attention, posture, position, orientation, contacts (e.g., grip on handlebars), rider slip (e.g., contact between rider and seat), rider to vehicle relation, and rider to world relation.

Figure 2:
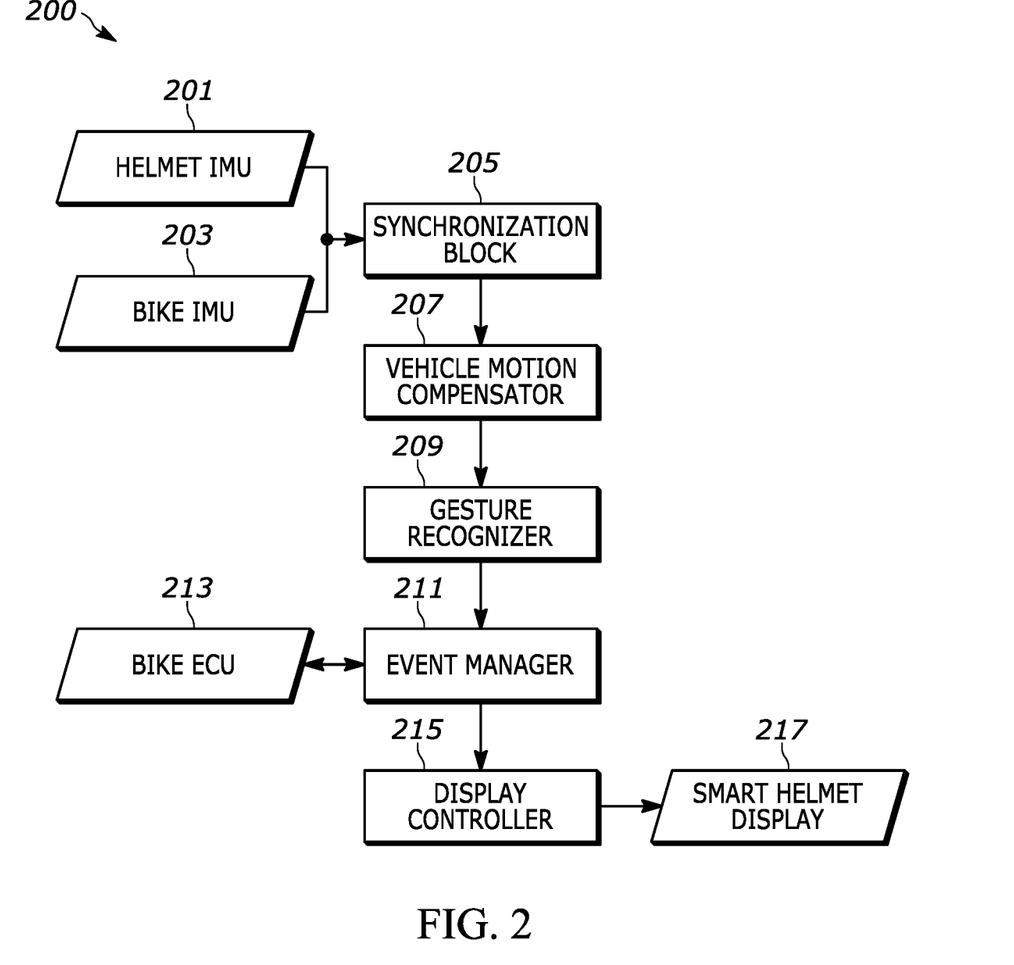
FIG. 2 is an example of a system design for a smart helmet and motorcycle that allows for gesture recognition.

FIG. 2 illustrates a block diagram of a system for gesture interaction on a smart helmet. In order to improve the robustness of the gesture recognition system and to compensate for the vehicle motion, the system may use the measurements from the bike IMU 203. However, the measurements from the motorcycle IMU 203 attached to the motorcycle (z¬B(tB)) (e.g., ride movement of the bike at a certain point in time) and the IMU attached to the helmet (zH(tH)) (e.g., ride movement of the helmet at a certain point in time) are captured at different time instances on devices with different clock domains. Hence, in the synchronization block timestamps data received from the helmet and the motorcycle are compared to perform clock domain synchronization. Utilizing the result of the synchronization, the IMU measurements from the motorcycle (e.g., bike IMU) may be time-shifted to the helmet clock domain. The output of the synchronization block may be time series synchronized motion data (IMU measurements) from the helmet and the motorcycle.

$$f:\{zB(tB), t\neg H\} \rightarrow zB(tH)$$

The synchronization block 205 may include software that is utilized to synchronize all data that is being collected to help identify the gesture, including image data as well as other sensor data. The synchronization block 205 may not only collect the motion data from the helmet IMU 201 and the bike IMU 203, but it may also utilize image data that is collected from cameras located on the motorcycle or on the helmet. Thus, the camera data (e.g., image data) may also be utilized to help identify if a gesture is being made. For example, the camera may monitor a steady state position for the rider during normal riding periods, however, may include a detection mechanism to understand when the rider's helmet moves a certain way up or down.

The measured accelerations and rotational rates from the IMU on the helmet (e.g., helmet IMU 201) may need to be compensated by removing the effect of the vehicle motion. For example, the system may need to understand the riding environment in order to understand when the user is providing a gesture and differentiate the gesture from head movement that has occurred in response to road bumps or other natural riding occurrences. The system may remove the effect of the vehicle motion by using the time synchronized measurements from the motorcycle (e.g., bike IMU, bike camera etc 203). The time synchronized block may compare data from the helmet and the motorcycle at specific times to see if there is correlation that caused by the vehicle environment versus a gesture. A relative rigid body transformation between the vehicle and the helmet IMU (THB(t)) is used to transform the measurements from the motorcycle IMU into the coordinate frame of the helmet IMU. The transformed value may be subtracted to estimate the compensated helmet measurements (zc(t)). The rigid body transformation is time dependent and needs to be estimated continuously. A non-linear filter may be utilized to minimizes the error between predicted pose of the helmet and the pose observed by the integrating helmet IMU measurements. The predicted pose of the helmet is derived using the based on a human skeleton model. The result of the non-linear filter is the relative transformation THB(t).

$$zc(tH) = zH(tH) \theta THB(tH) zB(tH)$$

A gesture recognizer 209 may include software for gesture recognition. The gesture recognition may be performed by comparing the current compensated helmet IMU measurement sequence over a window $w, z_c(t_H-w:t_H+w)$ with a database of helmet IMU motion sequence for each gesture. $z_H(t_H)$ is the original helmet IMU measurement and $t_H$ refers to the time in the helmet clock. $Z_c(t_H)$ is the compensated helmet IMU measurement in which the effect vehicle motion is removed. The gesture recognition may be performed on the window of a time period to compare data points from various times across a set amount of time. The IMU measurement sequence is shown as $Z_c(t_H-w:t_H+w)$. Different window lengths can be examined since different gestures have different duration. The window may be a time period to compare data points from various times across a set amount of time. Various gestures, such as the nod, yaw, lookup, tilt, pitch, stationary gestures may be pre-trained in static environment. Thus, the system may include an option to activate a learning mode that asks a user to imitate such gestures (the nod, yaw, lookup, tilt, pitch, stationary gestures) to record the IMU data as a baseline when the motorcycle is in the static environment. Each gesture may be encoded using different internal representation. Thus, each of the gestures may have an associated IMU measurement over a time period to associate with that gesture. The gesture recognizer may provide a likelihood for each class of gesture during runtime. Bayesian learning, deep learning or other learning approaches can be used to create a learnt gesture recognizer model. Inferences can be made on this model to detect and identify the gesture as associated likelihoods. The class with the highest likelihood is selected as output. The output may command an action that is associated with each gesture. For example, a tilt left or tilt right may be associated with activating a turn signal. The helmet may send such data wirelessly to the motorcycle to request the motorcycle to initiate the command. A filter based on history of detector outputs is used to reduce noise and perform outlier detections.

The event manager 211 may synchronize the output from the rider's gesture recognition block with the information from the bike ECU 213. The bike ECU 213 may be utilized to aggregate messages from the different parts of the motorcycle, as well as to collect data and other information from other sensors on the bike. The event manager may contain trigger messages for notifications, alerts, and vehicle information that are displayed to the rider or provided using audio sound output. The event manager 211 may use a finite state machine whose transitions are determined by the trigger message from the ECU and the recognized gestures. Thus, a different gesture may be timed based on the messages retrieved from the event manager from the bike, helmet, or off-board server. Thus, a gesture of a nod from the helmet may include different output commands when a low fuel warning is present, versus when the motorcycle is utilizing cruise control. Similarly if the rider is using the intercom, gesture operations can be used to control the intercom, which in other conditions might be used for playing audio/music.

The event manager 211 may drive or operate the display controller 215. The display controller 215 may contain information about the layout for different information. For example, the display controller 215 may decide what status information is shown on the helmet display and also the manner in which it has to be provided. Furthermore, the display controller 215 may also store the graphical user interface (GUI) elements and animations displayed on the smart helmet display. The control and navigation GUI elements may be changed based on the inputs from the gesture recognizer. For example, a nod left or right utilizing the smart helmet may change the navigation display screen that is displayed on the smart helmet, or change modes from audio mode to navigation mode, for example. The display controller 215 may also contain a profile of layouts for different riding scenarios which can be changed utilizing gestures. For example, the layouts may include interfaces for audio screens, hands free communication, vehicle information (e.g., speed, engine revolutions, tire pressure, temperature, fuel economy, fuel mileage, fuel level, etc.), navigation information, etc.

The smart helmet display 217 may be utilized to output objects on a HUD. The helmet can include, but is not limited to, a front facing camera, a rear facing camera, an accelerometer, a volatile memory, a non-volatile memory, a power source, a data connector, a HUD, a Global Positioning System (GPS), a processor, a network transceiver, a Bluetooth transceiver, and the like. In the embodiment, the electronic components cooperate to perform a variety of tasks including, but not limited to, displaying vehicle instrumentation information, automatically performing emergency procedures (e.g., calling an EMS), presenting pre-collision warning, recording sensor information (e.g., IMU data), etc. The smart display 217 may include a HUD that can be a transparent display which can presents data without requiring the rider to look away from a selected viewpoint. The smart display 217 can be presented within a visor (e.g., embedded display), presented within a display proximate to helmet, and the like. Display 217 technology can include liquid crystal display (LCD), liquid crystal on silicon (LCoS), digital micro-mirrors (DMD), organic light-emitting diode (OLED), optical waveguide, scanning laser, and the like. Display 217 can present relevant information in real-time or near real-time.

Figure 3:
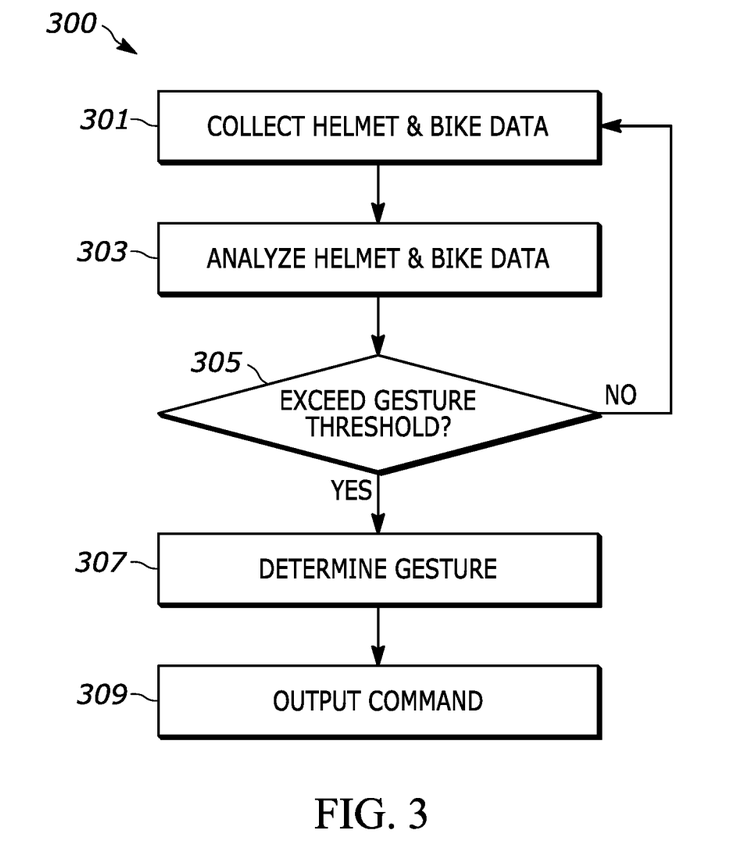
FIG. 3 is an example flow chart of a smart helmet that allows gesture recognition.

FIG. 3 is an example flow chart of a smart helmet that allows gesture recognition. At step 301, the system may collect both the helmet data and bike data. Such data may include IMU and image data from the helmet, as well as from the motorcycle or power two-wheeled vehicle. The system may aggregate the data to later utilize the data to determine if a gesture has been commanded by the user, or to determine how to compensate for the movement of the motorcycle to identify a gesture. Thus, the system will want to avoid identifying a gesture during an inadvertent condition when the road conditions or movement of the motorcycle causes jerking or other sudden movement of the helmet. As explained, the motorcycle movement data collected by the motorcycle IMU and/or the image data may be utilized to compensate for the bike's movement.

At step 303, the system may analyze the helmet data and motorcycle data that is collected from the various sensors, cameras, and other components. The system may analyze the data either offline at a remote server (e.g., the cloud), at the helmet via the helmet's processor, or at the motorcycle via the motorcycle's processor. From there, the system may collect movement data of both the helmet and motorcycle to determine if the user intentionally attempted to create a gesture to activate a command or action. The analysis may include compensation for vehicle movement, as discussed above with respect to FIG. 2.

At step 305, the system may determine if the gesture has been recognized. Thus, the movement may match or come close to matching a baseline gesture measurement, or exceed a movement threshold to be identified as a gesture. The system may include baseline measurements for each gesture based on the helmet IMU. The system may also utilize camera data from a motorcycle or on the helmet to help identify the gesture utilizing images that may be compared to the gesture. Furthermore, it may compensate for any movement from the motorcycle as shown by the IMU.

At step 307, the system may identify the gesture and associated command related to the gesture. The system may have a look up table that stores each associated command as related to each gesture. For example, a head tilt right may activate a right turn signal, and a head tilt left may activate a left turn signal. The look up table may include information as to what command must be sent to which controller. Furthermore, the look-up table may map also different commands for different gestures based on the display interface of the smart display. For example, a head nod during an audio mode may change tracks, but a head nod during a hands-free conversation may change call volume.

At step 309, the system may then output the command associated with the gesture. The commands include having a processor execute commands related to the gesture, followed by displaying any relevant information on the display of the smart helmet. The commands may be related to features on the vehicle helmet or on the motorcycle itself. Furthermore, the commands may require wireless data or other information to be exchanged between the helmet, bike, off-board servers, other bikes, etc. Information may also be displayed on an instrument cluster of the motorcycle to identify executing of the command or to update a status.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A helmet, comprising:
    a transceiver in the helmet configured to receive vehicle data from one or more sensors located on a vehicle, wherein the vehicle data includes image data associated with a rider-facing camera of the vehicle;
    an inertial measurement unit (IMU) in the helmet that is configured to collect motion data of the helmet associated with a rider of the vehicle; and
    a processor in the helmet that is in communication with the transceiver and the IMU, and programmed to:
        receive, via the transceiver, vehicle data from the one or more sensors located on the vehicle;
        determine a gesture in response to the vehicle data from the one or more sensors located on the vehicle and the helmet motion data from the IMU, wherein the processor is further programmed to compensate vehicle motion utilizing the vehicle data in determining the gesture;
        output on a display of the helmet a status interface related to the vehicle, in response to the gesture; and
        wherein the processor is further programmed to determine the gesture by comparing a current compensated helmet IMU measurement sequence over a window w, $Z_c(t_H-w:t_H+w)$ with a database of helmet IMU motion sequence for each gesture, gesture, wherein $Z_c(t_H)$ is the compensated helmet IMU measurement in which the effect vehicle motion is removed, wherein w is a time period to compare data points from various times across a set amount of time, wherein $t_H$ refers to the time in the helmet clock, wherein $Z_c(t_H-w:t_H+w)$ is the IMU measurement sequence.

2. The helmet of claim 1, wherein the vehicle data and helmet motion data each includes time stamps identifying when the vehicle data or helmet motion data were collected, wherein the time stamps are utilizing to perform clock domain synchronization.

3. The helmet of claim 1, wherein the processor is further programmed to compensate the helmet motion data utilizing at least the vehicle data.

4. The helmet of claim 1, wherein the processor is further programmed to compensate utilizing time stamps from the vehicle data and helmet motion data.

5. The helmet of claim 1, wherein the processor is further configured to determine the gesture in response to a nod, yaw, lookup, tilt, or pitch.

6. The helmet of claim 1, wherein the helmet includes a heads-up display configured to output graphical images on a visor of the helmet.

7. The helmet of claim 1, wherein the helmet includes a camera.

8. The helmet of claim 1, wherein the processor is further programmed to remove an effect of vehicle motion by utilizing one or more time synchronized measurements from the vehicle, wherein the time synchronized measurements compare data from the helmet and the vehicle at specific times to determine a correlations caused by a vehicle environment.

9. A system that includes a helmet and a vehicle with at least two wheels, comprising:
    a helmet transceiver configured to receive vehicle data from one or more sensors located on the vehicle;
    a helmet inertial measurement unit (IMU) configured to collect helmet motion data associated with the helmet;
    a rider-facing camera located on the vehicle and configured to monitor a rider of the vehicle and collect rider image data; and
    a processor in the helmet in communication with the helmet transceiver and helmet IMU, and programmed to:
    receive, via the transceiver, gesture data from the helmet transceiver and vehicle motion data from a vehicle IMU;
    determine a gesture in response to the gesture data and compensating the helmet motion data with the vehicle data, wherein the processor is further programmed to compensate for vehicle motion utilizing the vehicle data, wherein the gesture is determined by comparing a current compensated helmet IMU measurement sequence over a window w, $Z_c(t_H-w:t_H+w)$ with a database of helmet IMU motion sequence for each gesture, wherein $Z_c(t_H)$ is the compensated helmet IMU measurement in which the effect vehicle motion is removed, wherein w is a time period to compare data points from various times across a set amount of time, wherein $t_H$ refers to the time in the helmet clock, wherein $Z_c(t_H-w:t_H+w)$ is the IMU measurement sequence; and output on a display of the helmet an action in response to the gesture.

10. The system of claim 9, wherein the processor in the helmet is further programmed to activate a learning mode to identify one or more gestures in a static vehicle environment when the vehicle is not in operation and in response to an associated IMU measurement over a time period from the helmet IMU.

11. The system of claim 9, wherein the display of the helmet includes a heads-up display configured to output graphical images on a visor of the helmet.

12. The system of claim 9, wherein the vehicle is a motorcycle or a powered two-wheel unit.

13. The system of claim 9, wherein the processor is further configured to determine the gesture utilizing at least the rider image data.

14. The system of claim 9, wherein the vehicle data includes vehicle motion data collected from the vehicle inertial measurement unit.

15. A helmet, comprising:
a transceiver configured to receive vehicle data from one or more sensors located on a vehicle, including image data proximate to a rider of the vehicle, wherein the image data is from a rider-facing camera of the vehicle;
an inertial measurement unit (IMU) configured to collect helmet motion data of the helmet associated with a rider of the vehicle; and
a processor in communication with the transceiver and IMU, and programmed to:
receive, via the transceiver, vehicle data from the one or more sensors located on the vehicle; and
determine a gesture in response to the vehicle data from the one or more sensors located on the vehicle and the helmet motion data from the IMU, wherein the processor is further programmed to compensate vehicle motion utilizing the vehicle data; and
execute a command in response to the gesture;
wherein the processor is further programmed to determine the gesture by comparing a current compensated helmet IMU measurement sequence over a window w, $Z_c(t_H-w:t_H+w)$ with a database of helmet IMU motion sequence for each gesture, wherein $Z_c(t_H)$ is the compensated helmet IMU measurement in which the effect vehicle motion is removed, wherein w is a time period to compare data points from various times across a set amount of time, wherein $t_H$ refers to the time in the helmet clock, wherein $Z_c(t_H-w:t_H+w)$ is the IMU measurement sequence.

16. The helmet of claim 15, wherein the processor is further programmed to output a status of the vehicle on a display of the helmet in response to the gesture.

17. The helmet of claim 16, wherein the processor is further programmed to execute the command to activate a function at the vehicle based upon the gesture.

18. The helmet of claim 15, wherein the processor is further programmed to activate a learning mode to identify one or more gestures in a static vehicle environment when the vehicle is not in operation.

* * * * *